Oct. 27, 1964 R. H. VERSCH ET AL 3,154,200
POLE HANDLING DEVICE
Filed May 14, 1962 3 Sheets-Sheet 3

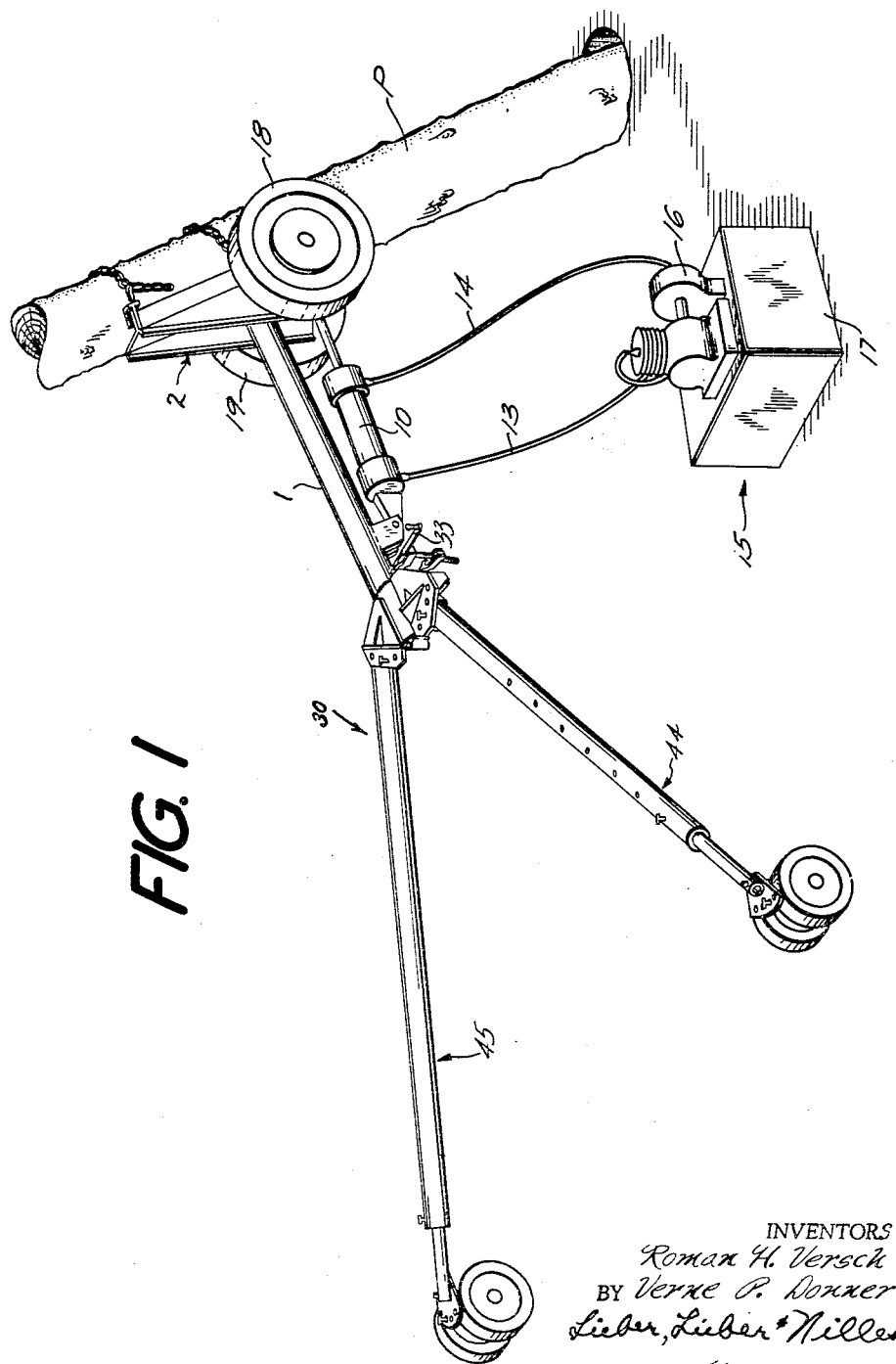

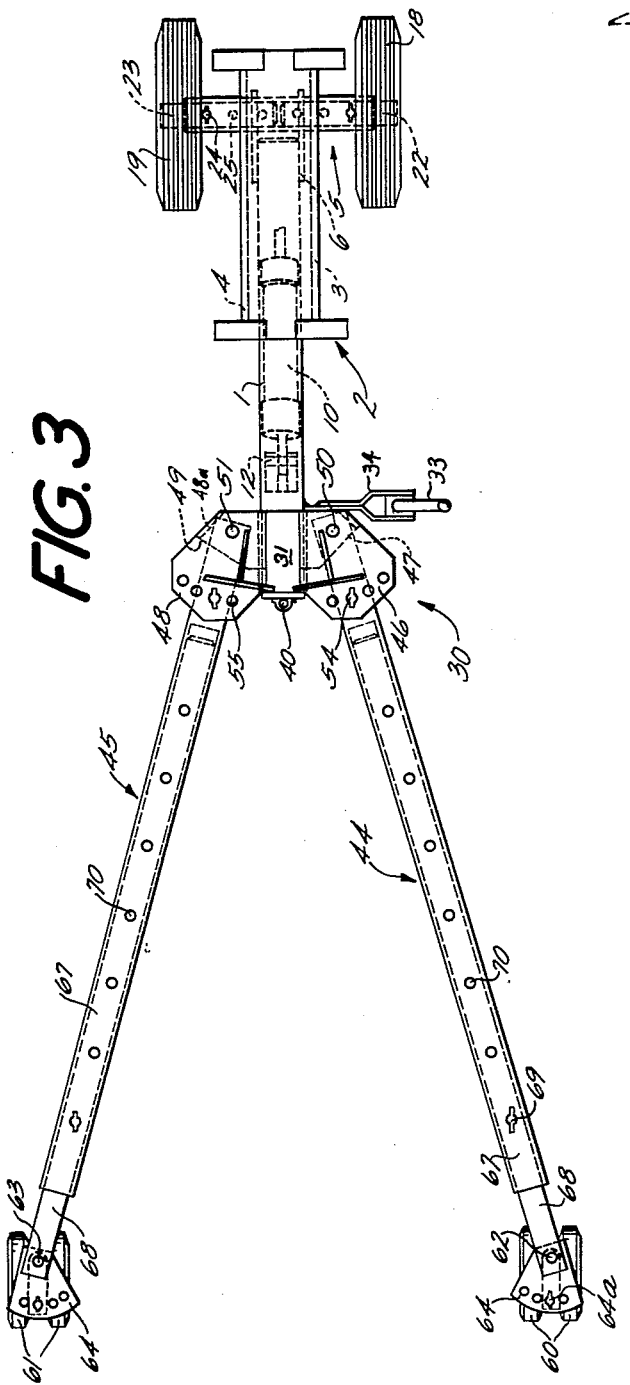

INVENTORS
Roman H. Versch
BY Verne P. Donner
Lieber, Lieber & Nilles
Attorneys

United States Patent Office 3,154,200
Patented Oct. 27, 1964

---

3,154,200
POLE HANDLING DEVICE
Roman H. Versch, Plymouth, Wis., and Verne Paul Donner, Palatine, Ill., assignors to Gilson Brothers Company, Plymouth, Wis., a corporation of Wisconsin
Filed May 14, 1962, Ser. No. 194,381
6 Claims. (Cl. 214—3)

This invention relates to power-operated devices for handling utility line poles or the like and more particularly relates to a compact vehicle for transporting a pole in a horizontal position and then swinging it to a vertical position and into a hole in the ground.

Hydraulic pole jammers of the above general type have heretofore been proposed and used with success under certain circumstances.

These devices should be capable of safe use with a minimum amount of manpower and on contours of the ground which are other than level. Certain prior art devices could not safely handle large poles, nor could they operate on inclined or otherwise uneven terrain. In addition, they required several men for their operation, some of the men being necessary for stabilizing and guiding the poles with guy wires or the like while the pole was being swung to a vertical position.

These pole handling devices should also be capable of transporting the pole in trailing fashion behind a tractive vehicle with good weight distribution and do so with good stability at high speeds. On the other hand, they should provide good lateral stability when raising a pole and, if necessary, be capable of sufficient flexibility so as to work in areas in which their movement is restricted due to surrounding obstacles.

Accordingly, the present invention provides a hydraulic pole handling device which overcomes the prior art shortcomings and has the above-mentioned desirable characteristics and advantages.

Another aspect of the present invention relates to a pole handling device of the above type in which that end of the frame to which the pole is secured is elevated along with the pole as the latter is swung to the vertical position, using the base of the pole as a fulcrum point; the arrangement and position of the load-carrying wheels relative to the base of the pole is such that when the pole is in position in the hole, the frame is located closely adjacent the ground where it can be easily and safely unfastened from the pole.

These and other objects and advantages of the invention will appear hereinafter as this disclosure progresses, reference being had to the accompanying drawings, in which:

FIGURE 1 is a perspective view of a pole handling device made in accordance with the present invention, and showing the pole as it is being swung to its vertical position;

FIGURE 2 is a side elevational view of the device of FIGURE 1, but in a position prior to its being swung to the vertical position, the near wheel being shown as removed for clarity;

FIGURE 3 is a plan view of the device as shown in FIGURE 2;

Figure 4:
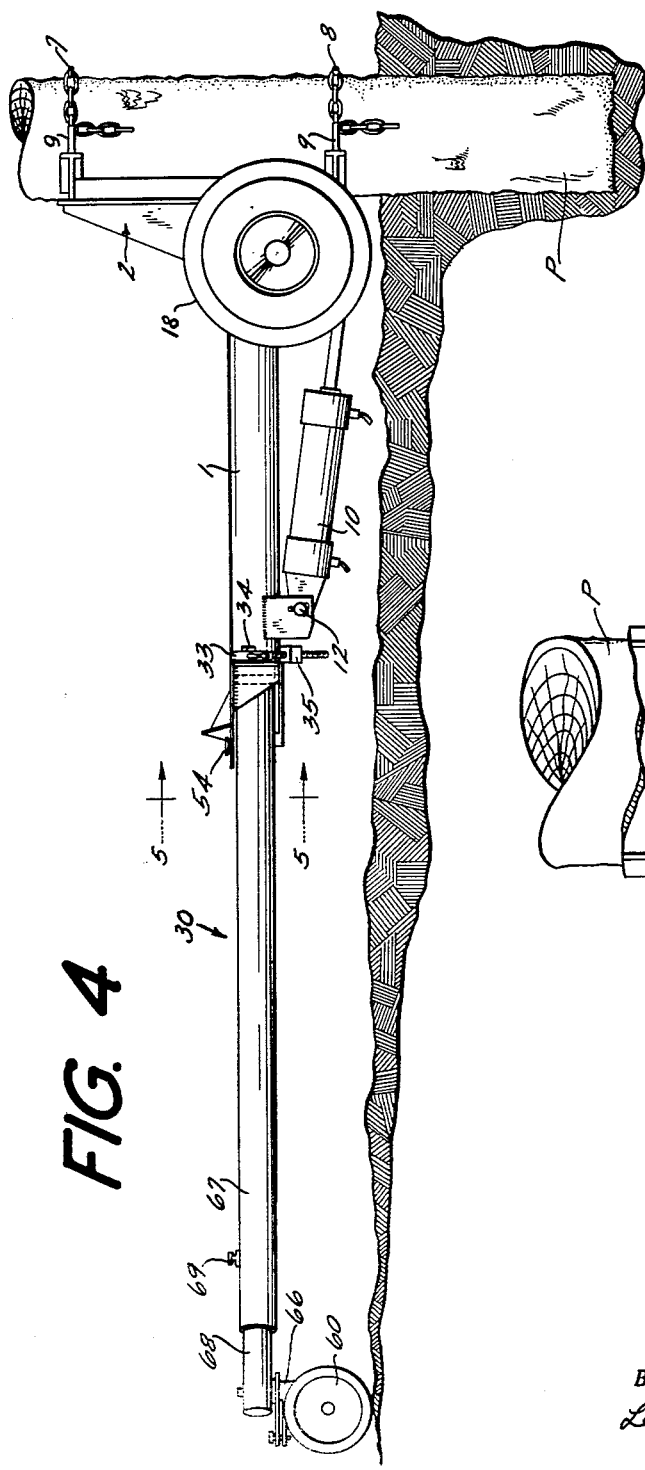
FIGURE 4 is a side elevational view showing the pole in its position in the hole and before the device has been detached therefrom.
Figure 5:
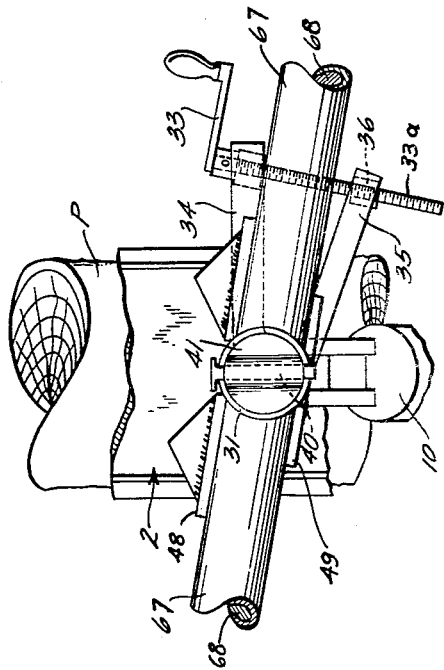
FIGURE 5 is a fragmentary, cross-sectional view, taken along line 5—5 in FIGURE 4, but on an enlarged scale and showing the outrigger assembly in a rotated position relative to the front part of the device.

Referring in greater detail to the drawings, the pole handling device includes an elongated backbone 1 formed from a tubular steel member.

A pole supporting saddle 2 is pivotally mounted relative to the backbone by its downwardly extending and spaced apart plates 3 and 4 which rotatably embrace an axle housing 5. The axle housing is rigidly secured to the backbone by a pair of gusset plates 6 welded to the housing and backbone. The saddle is thus located adjacent the front end of the backbone and is pivotable relative thereto.

Suitable means are provided on the saddle for detachably securing a pole P, and this means has been shown as taking the form of a pair of chains 7 and 8 which are secured to the saddle and have conventional quick-acting latches 9, for example, of the overcenter type, which permit the chains to be quickly and tightly secured around the pole or be detached therefrom.

Power-operated means are provided between the backbone and saddle for positively swinging the latter between a generally horizontal, pole transporting position shown in FIGURE 2 to a vertical, pole setting position as illustrated in FIGURE 4. This means takes the form of a double-acting hydraulic ram 10 which is pivotally secured at its rod end to the saddle as at 11 and at its head end to the backbone as at 12. It will be noted that the ram is located directly beneath the backbone so as to permit the pole to lie closely adjacent to the upper side of the backbone, thus keeping the overall height of the device close to the ground for good stability. With this arrangement, contraction of the ram acts to swing the saddle to the pole setting position.

Conduits 13 and 14 connect the head and rod ends, respectively, of the ram to a portable power unit 15. Unit 15 may be of the internal combustion engine type having connected therewith a hydraulic pump 16 and reservoir 17.

Ground engaging wheels 18 and 19 are rotatable on their axles 22 and 23 which are telescopingly received in the axle housing 5 adjacent the front end of the backbone. It will be noted that the ground wheels extend forwardly (to the right in FIGURE 2) beyond the forward end of the saddle.

The tread of the wheels is adjustable by means of pins 24 which extend selectively through alignable aperatures 25 in the housing and axles to thereby adjustably fix the tread of the wheels in any desired position for transport on highways, through narrow gates, or other restricted areas.

The pole handling device also includes an outrigger assembly 30 which is rotatably mounted on the backbone about a longitudinal axis and adjacent the rear end of the backbone. This permits relative rotation between the outrigger assembly and the backbone and pole carried thereby.

The outrigger assembly includes a longitudinally positioned tubular member 31 which forms a socket that slips over the rear end of the backbone 1 and in which the latter is thus oscillatably mounted. The length of this socket connection is such as to give good bearing support between the backbone and outrigger assembly for a sufficient distance so that sagging of the device is precluded.

Means are also provided for adjusting the angular relationship between the backbone and the outrigger assembly, and while this means will be described as a manually operated one, other means could also be used without departing from the scope of the invention as defined in the claims. In any event, this adjusting means permits the pole carried by the saddle on the backbone to be rotated transversely and relative to the outrigger assembly, so that the pole can be maintained in a vertical direction when viewed longitudinally of the device and while being raised thereby.

The adjusting means to be described holds the backbone and its associated parts securely in their adjusted position relative to the ground engaging outrigger assembly.

This adjusting means has been shown as including a crank 33 which is rotatable in the bifurcated free end of a laterally extending brace 34. The other end of the brace is welded to the backbone and also acts to serve as a stop in one axial direction for the tubular socket member 31. Another laterally extending brace 35 is welded to socket member 31 and carries in its bifurcated free end a threaded block 36 which is in threadable engagement with the threaded shaft portion 33a of the crank. Rotation of the crank in one direction or the other causes the braces to be brought toward one another or swung further apart, thereby causing relative rotation between the outrigger assembly and the pole carrying backbone 1.

As previously indicated, brace 34 acts to limit forward movement of the socket member on the backbone. The socket member is held captive on the backbone in the rearward direction by means of a cross pin 40 which removably extends from a plug 41 that is secured by welding within the rear end of the backbone and extends slightly therefrom. In this manner, the device can be readily disassembled for shipping, storage, or other purposes.

A pair of transversely swingable outrigger booms 44 and 45 are pivotally secured at their front ends between the pairs of horizontally disposed and parallel plates 46, 47 and 48, 49, respectively, that are welded to the socket member 31 and extend outwardly therefrom. A vertical reinforcing gusset plate 46a is welded between plates 46 and 47, and a similar plate 48a is welded between plates 48 and 49.

Short shafts 50 and 51 extend through their respective booms 44 and 45 and through the corresponding plates 46, 47 and 48, 49 and provide the vertical pivot axis for the booms.

The booms are held in any selected lateral position by the removable eyebolt pins 54 which extend through the holes 55 arranged in an arc in plates 46 and 48 and which are alignable with a hole in each of the booms. The booms are thereby adjustably swingable between a central transport position closely adjacent one another or any one of a selected stabilizing position.

The rear ends of the booms are each provided with a pair of smaller ground engaging wheels 60, 61 which are pivoted about their respective vertical axes 62, 63. These pairs are fixable in any selected position to provide proper tracking ability for any transverse position of the booms. This is accomplished by the parallel plates 64, 65 which are fixed, respectively, to their boom and axle housing 66 and are held in any adjusted position by pins 64a that extend through alignable apertures in the plates.

The booms may, if desired, be of the extensible type, such as would be provided by the telescoping members 67, 68 held in any selected position by a pin 69 removably extending through alignable apertures 70 therein.

*Operation*

The front wheels 18 and 19 extend forwardly beyond the saddle, as shown in FIGURE 2. The butt end of the pole is positioned on the saddle so it extends forwardly a sufficient distance whereby when the pole is set in its final position in its hole (FIGURE 4), the front end of the device is located closely adjacent the ground. In this manner, the device may be readily detached from the pole by removing the chains and without requiring the device to be dropped any appreciable distance to the ground. Generally speaking, the average utility pole may be set into a six-foot deep hole, for example. In such a situation, the initial overhang of the butt end of the pole beyond the wheels would be slightly greater than six feet.

As the periphery of the wheels extends beyond the extremities of the front side of the saddle, the latter can be swung by the ram to initially tilt the pole to a preliminary position without contacting the ground. In such a preliminary position, the butt end of the pole engages the top of the hole and the latter thereby provides a fulcrum point for the continued upward swinging procedure.

Continued contraction of the ram causes further swinging of the pole toward the vertical position and simultaneous raising of the front end of the device, as shown in FIGURE 1.

Then, as the ram is further contracted to swing the pole to the vertical position, the pole descends into the hole, as shown in FIGURE 4.

During the swinging of the pole, the leveling device 33 et al. is adjusted to rotate the backbone sufficiently to maintain the pole vertical in a transverse direction. The wheels of the booms remain on the ground and act to stabilize the device. This leveling operation is important, particularly on uneven terrain and eliminates the need for transverse guy ropes and the extra manpower for the guiding and holding thereof.

The invention provides a compact and flexible pole handling device which can safely and efficiently perform the functions for which it was designed.

Various modes of carrying out the invention are contemplated as being within the scope of the following claims particularly pointing out and distinctly claiming the subject matter which is regarded as the invention.

We claim:

1. A pole handling device comprising, a main backbone having a front end and a rear end, a pole supporting saddle pivotally mounted on said backbone adjacent said front end and about a transverse axis, ground wheel means mounted on said backbone and also adjacent said front end, power-operated means connected between said backbone and saddle for swinging the latter between a substantially horizontal pole transporting position and upwardly to a substantially vertical pole setting position, said front end and said wheel means being raised as said saddle is swung to said substantially vertical pole setting position, an outrigger assembly rotatably mounted on said backbone adjacent said rear end thereof and about a longitudinal axis, said outrigger assembly engaging the ground for transverse support of said device as said front end and wheel means are raised, and adjustable means between said backbone and outrigger assembly for effecting relative rotation therebetween about said longitudinal axis to thereby permit a pole to remain vertical in a transverse direction while being swung upwardly by said saddle.

2. A pole handling device comprising, a main backbone, a pole supporting saddle pivotally mounted adjacent one end of said backbone and about a transverse axis, a pair of ground wheels mounted on said backbone adjacent said one end, power-operated means connected between said backbone and saddle for swinging the latter between a substantially horizontal pole transporting position and a vertical pole setting position, an outrigger assembly rotatably mounted on said backbone adjacent the other end thereof and about a longitudinal axis, said outrigger assembly including a pair of pivotally mounted booms which are adjustably swingable in a transverse direction, and adjustable means between said backbone and outrigger assembly for effecting relative rotation therebetween about said longitudinal axis to thereby permit a pole to remain vertical in a transverse direction while being swung into a vertical position in a longitudinal direction.

3. A pole handling device comprising, a backbone, a saddle pivotally mounted on said backbone and about a transverse axis, ground wheel means mounted on said backbone, power-operated means connected between said backbone and saddle for swinging the latter between a pole transporting position and a substantially vertical pole setting position, an outrigger assembly connected to said backbone for relative rotation therewith about a longitudinal axis, means between said assembly and said backbone for adjusting the former relative to the latter, said outrigger assembly including a pair of pivotally mounted booms which are adjustably swingable in a transverse direction, and means for effecting said relative rotation to thereby permit a pole to remain vertical in a transverse direction while being swung into a vertical position in a longitudinal direction.

4. A pole handling device comprising, a main backbone having a front end and a rear end, a pole supporting saddle pivotally mounted on said backbone adjacent said front end and about a transverse axis, a pair of ground wheels mounted on said backbone about said transverse axis, the periphery of said wheels extending forwardly beyond said saddle, power-operated means connected between said backbone and saddle and located therebeneath for swinging the latter about said transverse axis and between a substantially horizontal pole transporting position and a substantially vertical pole setting position, an outrigger assembly rotatably mounted on said backbone adjacent said rear end thereof and about a longitudinal axis, said outrigger assembly including a pair of pivotally mounted booms which are adjustably swingable in a transverse direction, and adjustable means between said backbone and outrigger assembly for effecting relative rotation therebetween about said longitudinal axis to thereby permit a pole to remain vertical in a transverse direction while being swung into a vertical position in a longitudinal direction.

5. A device as defined in claim 1 further characterized in that the periphery of said wheels extend forwardly beyond said saddle.

6. A device as defined in claim 1 further characterized in that said power operated means is located beneath said backbone and saddle.

References Cited in the file of this patent

UNITED STATES PATENTS

| 1,131,394 | Loeffler | Mar. 9, 1915 |
| 1,322,719 | Nelson | Nov. 25, 1919 |
| 1,363,327 | Larsh | Dec. 28, 1920 |
| 2,365,387 | Briscoe | Dec. 19, 1944 |
| 2,631,045 | McElhinney | Mar. 10, 1953 |
| 2,651,498 | Straub | Sept. 8, 1953 |
| 2,701,649 | Hallstrom | Feb. 8, 1955 |
| 2,814,396 | Neale | Nov. 26, 1957 |

FOREIGN PATENTS

| 14,329 | Great Britain | June 22, 1906 |
| 1,078,750 | Germany | Mar. 31, 1960 |

OTHER REFERENCES

Publication on Thiermann Pole Setter, 1962, by Parker's Welding and Mfg. Co., Milwaukee, Wisconsin, 4 pages.